United States Patent [19]

Masutani

[11] Patent Number: 5,196,903
[45] Date of Patent: Mar. 23, 1993

[54] PULSED LIGHT SOURCE SPECTROMETER WITH INTERFEROMETER

[75] Inventor: Koji Masutani, Tokyo, Japan

[73] Assignee: Jeol Ltd., Tokyo, Japan

[21] Appl. No.: 676,576

[22] Filed: Mar. 27, 1991

[30] Foreign Application Priority Data

| Mar. 29, 1990 | [JP] | Japan | 2-82126 |
| Mar. 29, 1990 | [JP] | Japan | 2-82127 |
| Mar. 29, 1990 | [JP] | Japan | 2-82128 |
| Sep. 28, 1990 | [JP] | Japan | 2-259356 |
| Sep. 28, 1990 | [JP] | Japan | 2-259358 |

[51] Int. Cl.$^5$ .............................................. G01B 9/02
[52] U.S. Cl. .................................................... 356/346
[58] Field of Search ......................................... 356/346

[56] References Cited

U.S. PATENT DOCUMENTS 5,021,661  6/1991  Masutani ............................ 356/346

FOREIGN PATENT DOCUMENTS 2153315  6/1971  Fed. Rep. of Germany ....... 356/346

Primary Examiner—Samuel A. Turner
Attorney, Agent, or Firm—Webb, Burden, Ziesenheim & Webb

[57] ABSTRACT

There is disclosed a Fourier transform spectrometer using a pulsed light source which can be selected from various types of light sources. The spectrometer Fourier-transforms the interferogram obtained by an interferometer to give rise to a spectrum. The spectrometer is characterized in that it includes a means for impulsively lighting up the light source for the interferometer at predetermined intervals of time and a means for extracting the envelope of the output from the interferometer as an interferogram. The spectrometer can further include a means for periodically applying a stimulus to the sample. In this case, time-resolved Fourier transform spectroscopy can be effected. The differential method can also be applied by lighting up the light source for the interferometer at intervals half the intervals at which the stimuli are given and by extracting the output from the interferometer via a band-pass filter and via a lock-in amplifier.

13 Claims, 14 Drawing Sheets

FIG. 2(a) LIGHT INTENSITY

FIG. 2(b) OUTPUT OF INTERFEROMETER

FIG. 2(c) CLOCK SIGNAL

FIG. 2(d) OUTPUT OF A/D CONVERTER

→ TIME

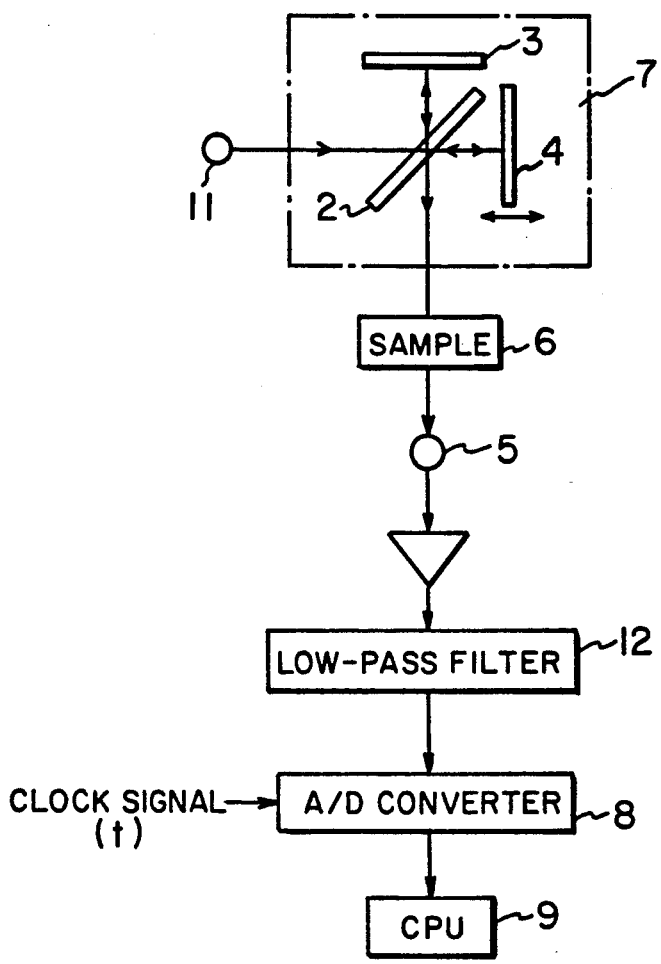
FIG. 3
| FIG. 4(a) | LIGHT INTENSITY |  |
| FIG. 4(b) | OUTPUT OF INTERFEROMETER |  |
| FIG. 4(c) | OUTPUT OF LOW-PASS FILTER |  |
| FIG. 4(d) | CLOCK SIGNAL |  |
| FIG. 4(e) | OUTPUT OF A/D CONVERTER | 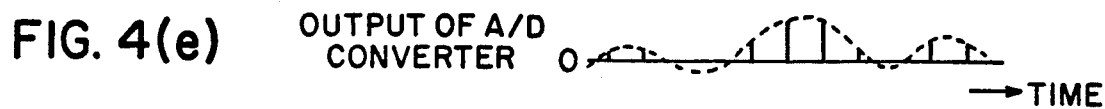 |
→ TIME

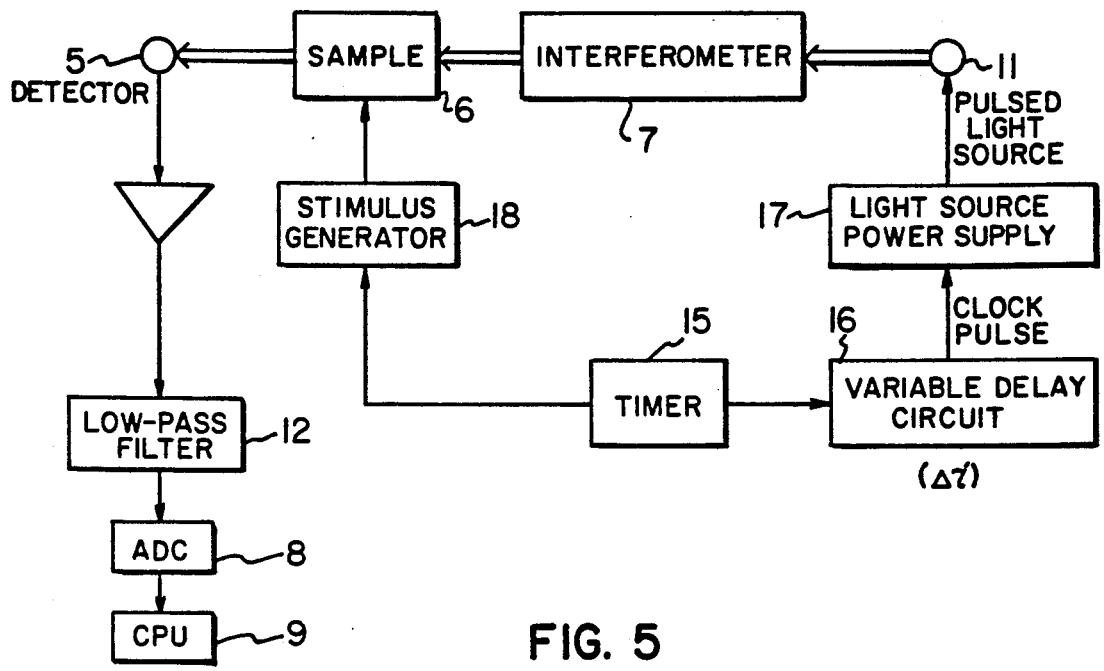
FIG. 5
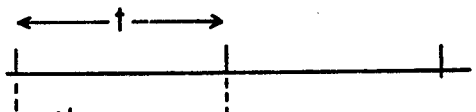
FIG. 6(a) CLOCK PULSE FOR SAMPLING
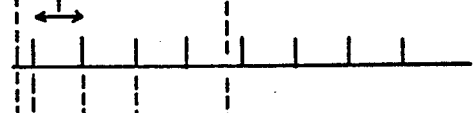
FIG. 6(b) STIMULI
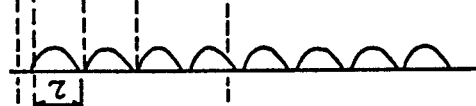
FIG. 6(c) RESPONSE OF SAMPLE
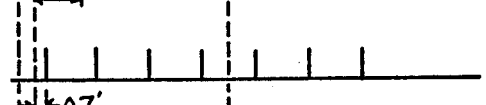
FIG. 6(d) PULSED LIGHT
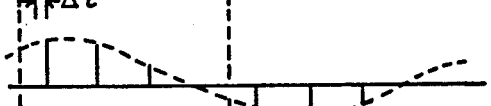
FIG. 6(e) OUTPUT OF INTERFEROMETER
FIG. 6(f) OUTPUT OF LOW-PASS FILTER
FIG. 6(g) OUTPUT OF A/D CONVERTER FIG. 8(a) CLOCK PULSE FOR SAMPLING

FIG. 8(b) STIMULI

FIG. 8(c) RESPONSE OF SAMPLE

FIG. 8(d) PULSED LIGHT

FIG. 8(e) OUTPUT OF INTERFEROMETER

FIG. 8(f) INPUT AND OUTPUT OF LOW-PASS FILTER 121

FIG. 8(g) INPUT AND OUTPUT OF LOW-PASS FILTER 122

FIG. 8(h) INPUT AND OUTPUT OF LOW-PASS FILTER 123

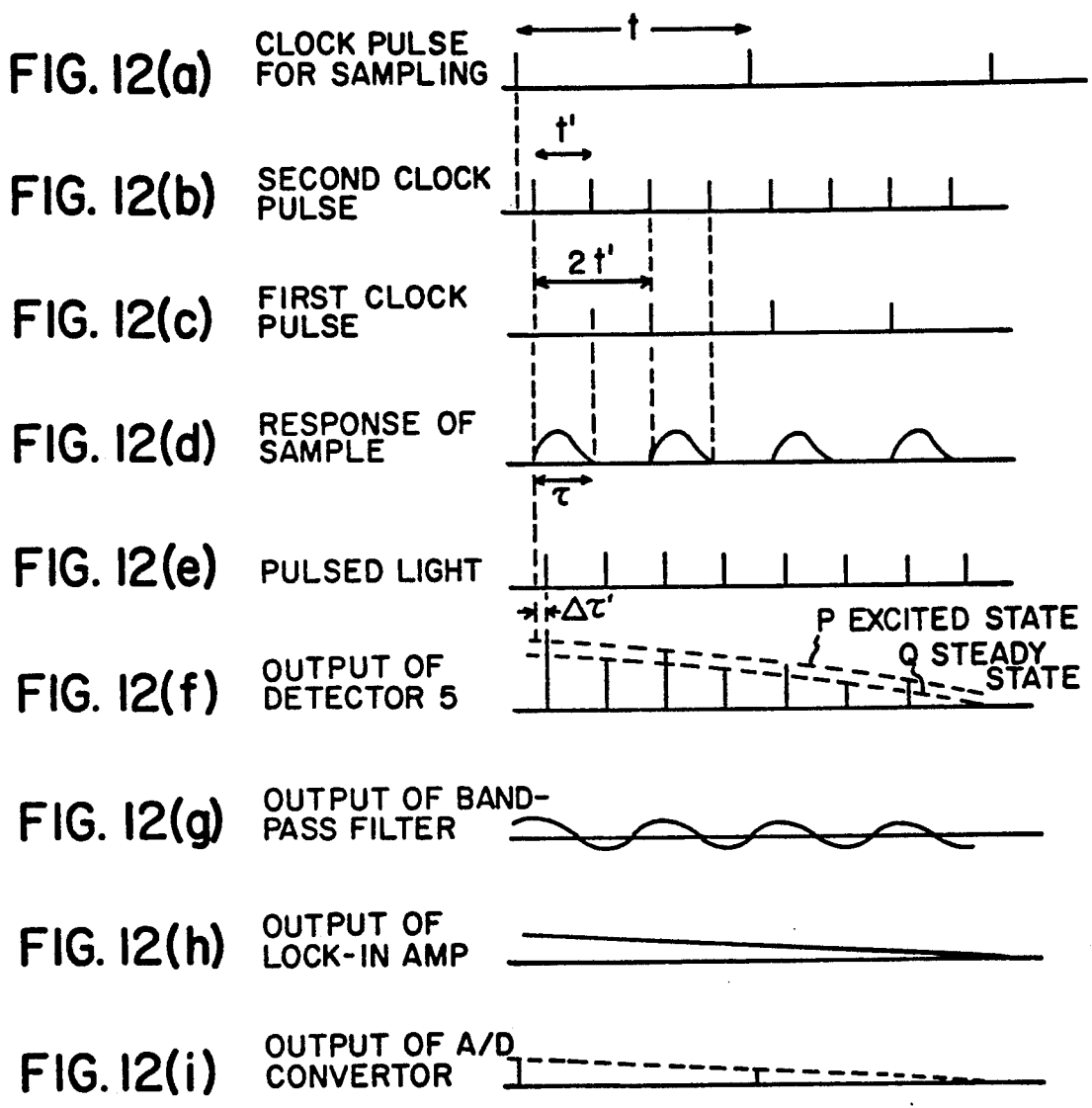

PULSED LIGHT SOURCE SPECTROMETER WITH INTERFEROMETER

FIELD OF THE INVENTION

The present invention relates to a Fourier transform spectrometer.

BACKGROUND OF THE INVENTION

FIG. 1 shows one example of Fourier transform spectrometer using a rapid scan interferometer typified by a Michelson interferometer. In FIG. 1, a light source 1 emits continuous light having a constant intensity, as shown in FIG. 2(a). The emitted light enters an interferometer 7 composed of a half mirror or beam splitter 2, a fixed mirror 3, and a moving mirror 4. The light is first divided by the mirror 2 into two beams one of which is directed to the fixed mirror 3, while the other is directed to the mirror 4 moving at a constant speed. The first beam is reflected by the fixed mirror 3, passes through the half mirror 2, and travels toward a detector 5. The second beam is reflected by the moving mirror 4 and then reflected toward the detector 5 by the half mirror 2. These two beams interfere with each other while traveling toward the detector 5. As a result, an interferogram as shown in FIG. 2(b) is obtained from the detector 5. A sample 6 is placed, for example, between the interferometer and the detector 5. The interferogram is sampled and converted into digital form by an analog-to-digital converter 8 in response to clock pulses (FIG. 2(c)) produced at intervals of t by the interferometer. The resulting interferogram (FIG. 2(d)) is sent to a computer 9, which takes the Fourier transform of the interferogram. As a result, a spectrum is derived.

The Fourier transform spectrometer of this construction uses continuous light of a constant intensity as shown in FIG. 2(a) and, therefore, limitations have been imposed on usable light sources. Also, only those samples which are not affected by continuous illumination of light can be investigated by this apparatus.

SUMMARY OF THE INVENTION

It is an object of the invention to provide a Fourier transform spectrometer using a pulsed light source which can be selected from various types of light sources.

It is another object of the invention to provide a Fourier transform spectrometer which uses a pulsed light source to investigate more varied samples than conventional.

It is a further object of the invention to provide a Fourier transform spectrometer capable of performing time-resolved spectrometry.

The Fourier transform spectrometer according to the invention is designed to obtain a spectrum by taking the Fourier transform of an interferogram derived from an interferometer, and comprises a light source emitting light to the interferometer, a means for impulsively lighting up the light source at predetermined intervals of time, and a means for extracting the envelope of the output from the interferometer as an interferogram.

In one embodiment of the invention, the Fourier transform spectrometer comprises an interferometer, a light source emitting light to the interferometer, a means for periodically giving a stimulus to a sample placed in the optical path inside the interferometer, a means for impulsively lighting up the light source after a given delay from each application of the stimulus, a means for obtaining the envelope of the output from the interferometer, and a Fourier transform means that takes the Fourier transform of the envelope to give rise to a spectrum.

In another embodiment of the invention, the Fourier transform spectrometer comprises an interferometer, a light source emitting light to the interferometer, a means for periodically giving a stimulus to a sample placed in the optical path inside the interferometer, a means for impulsively lighting up the light source at intervals half the intervals at which the stimuli are applied by the stimulus-giving means, a band-pass filter receiving the output from the interferometer, a lock-in amplifier synchronized with the lighting of the light source and receiving the output from the band-pass filter, and a Fourier transform means that takes the Fourier transform of the output from the lock-in amplifier to obtain a spectrum.

Other objects and features of the invention will appear in the course of the description thereof which follows.

BRIEF DESCRIPTION OF THE DRAWINGS

FIGS. 2(a) to 2(d) are waveform diagrams illustrating the operation of the spectrometer shown in FIG. 1;

FIG. 3 is a schematic diagram of a Fourier transform spectrometer according to the invention;

FIGS. 4(a) to 4(e) are waveform diagrams illustrating the operation of the spectrometer shown in FIG. 3;

FIG. 5 is a block diagram of a time-resolved spectrometer according to the invention;

FIGS. 6(a) to 6(g) are waveform diagrams illustrating the operation of the spectrometer shown in FIG. 5;

FIGS. 12(a) to 12(i) are waveform diagrams illustrating the operation of the spectrometer shown in FIG. 11;

DETAILED DESCRIPTION OF THE PREFERRED EMBODIMENTS

Figure 1:
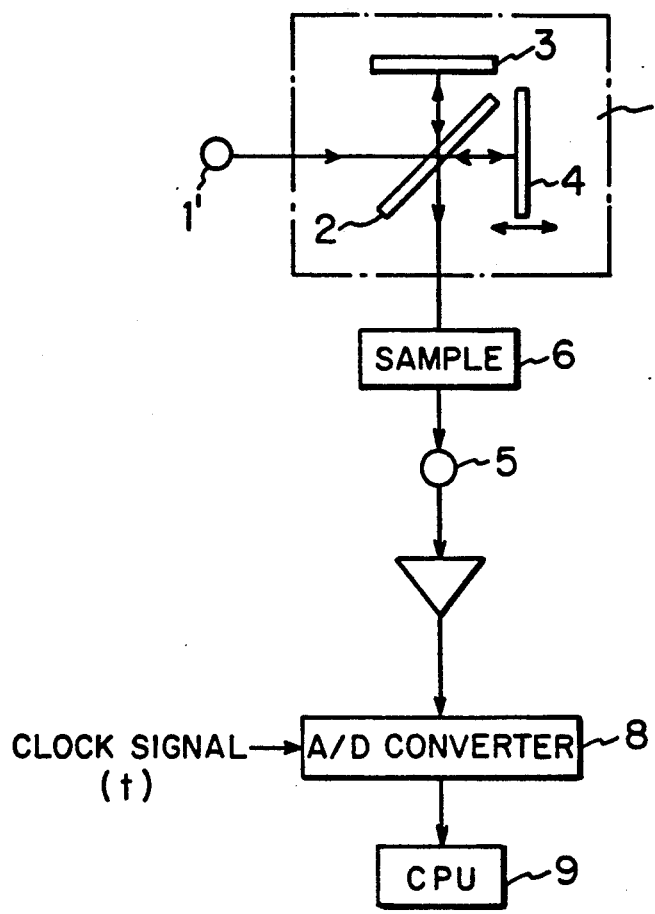
FIG. 1 is a schematic diagram of the prior art Fourier transform spectrometer.

Referring to FIG. 3, there is shown a Fourier transform spectrometer embodying the concept of the invention. This instrument comprises a pulsed light source 11, an interferometer 7 in which two light beams are made to interfere with each other, a detector 5 acting to detect the radiation transmitted through a sample 6, a low-pass filter 12 receiving the output signal from the detector 5, an analog-to-digital converter 8 for sampling the output signal from the filter 12, and a computer 9 for Fourier-transforming the output signal from the filter 12. The interferometer 7 consists of a half mirror or beam splitter 2, a fixed mirror 3, and a moving mirror 4. The light emitted from the light source 11 is incident on the half mirror 2. The sample 6 is so located that the light emerging from the interferometer 7 hits the sample 6.

The pulsed light source 11 emits pulses of light at regular intervals of t', the pulses having a constant intensity as shown in FIG. 4(a). The interval t' is so selected that it is shorter than the intervals of t at which the interferometer produces clock signals. The latter interval t is determined according to the sampling theorem. Since the pulses of light are employed in this way, the output from the detector 5 takes values obtained by sampling the interferogram (indicated by the broken line in FIG. 4(b)) derived using the prior art instrument at intervals of t'. The output signal from the low-pass filter 12 represents the envelope of the output from the detector 5 as shown in FIG. 4(c). In this way, the interferogram is reconstructed. This interferogram is sampled by the A/D converter 8 as shown in FIG. 4(e) in response to clock pulses produced at intervals of t shown in FIG. 4(d) in the same way as in the prior art techniques. The output signal from the converter 8 is sent to the computer 9, where the interferogram is Fourier-transformed. As a result, a spectrum of the sample 6 is obtained. Where the intensity of the pulses of light emitted by the light source 11 fluctuates, it is desired to normalize the output from the detector, using the information about the intensity obtained by monitoring the intensity.

A synchrotron orbital radiation (SOR) source can be used as the pulsed light source Also, it is possible to use a laser Raman spectrometer as the light source 11. In this case, the sample is placed in the position of the light source for the Raman spectrometer and periodically irradiated with exciting pulsed laser radiation. The Raman scattering produced periodically is directed to the interferometer 7. In this manner, the Raman-shifted components can be analyzed by the Fourier transform spectrometer. Of course, in this case, the sample 6 located between the interferometer and the detector is removed.

FIG. 5 shows a time-resolved spectrometer according to the invention. This instrument is similar to the instrument shown in FIG. 3 except that a timer 15 producing clock pulses at intervals of t', a stimulus generator 18 for giving stimuli to the sample 6 in response to the clock pulses, a variable delay circuit 16 for delaying the clock pulses, and a light source power supply 17 for causing the pulsed light source to go on in response to the output from the delay circuit 16 are added.

In the operation of the instrument shown in FIG. 5, it is assumed that the sample 6 responds equally to every stimulus at all times and that the response of the sample persists for time $\tau$ as shown in FIG. 6(c). We also assume that the time $\tau$ is shorter than the sampling interval t for the interferogram.

The timer 15 produces clock pulses at intervals of t' which are not synchronized with the clock pulses shown in FIG. 6(a) (produced at intervals of t) for sampling and are longer than the response time r, as shown in FIG. 6(b). The stimulus generator 18 gives stimuli as shown in FIG. 6(b) to the sample 6 in response to the clock pulses produced by the timer 15. The stimuli are given asynchronously with the clock pulses used for sampling. The variable delay circuit 16 delays the clock pulses from the timer 15 by a certain time $\Delta\tau'$. The power supply 17 for the light source causes the light source 11 to go on intermittently in response to the delayed clock pulses at the timing shown in FIG. 6(d).

Since the pulsed light source 11 is lit up at the timing shown in FIG. 6(d), the detector 5 produces discrete signals as shown in FIG. 6(e). That is, it substantially follows that the repeatedly produced stimulus is gated to the interferometer with a given delay and that the interferogram is sampled with the given delay. In this manner, discrete samples are obtained from the interferogram. The higher harmonics are removed from the output from the detector 5 by the low-pass filter 12. As a result, a continuous interferogram as shown in FIG. 6(f) is obtained as the envelope waveform of the signal shown in FIG. 6(e).

In the above-described structure, when the sample 6 does not vary, the output signal from the detector 5 is given by $$F(x) = \int B(\sigma) III_{t'}(t)(1 + \cos 2\pi\sigma x) d\sigma \quad (1)$$

where $III_{t'}(t)$ is a comb function consisting of equispaced delta functions, and $\sigma$ is the wave number $(= 1/\lambda)$.

When the stimulus is repeatedly applied to the sample 6, an interferogram of the sample 6 in transient state is obtained as the output from the detector 5 after a given delay $\Delta\tau'$ from the application of each stimulus. The output signal is given by $$F(x) = \int B'(\sigma, \Delta\tau') III_{t'}(t\Delta\tau')(1 + \cos 2\pi\sigma x) d\sigma \quad (2)$$

Letting v be the velocity of the moving mirror of the interferometer, we have the relation $x = 2vt$. Since the stimuli given periodically are not synchronous with the movement of the moving mirror, the stimuli are not in phase with the movement. Of $(1 + \cos 2\pi\sigma x)$ included in equation (2) above, only the term including $\cos 2\pi\sigma x$ can be transformed into a spectrum. If only this term is extracted, the output is given by $$F'(x) = III_{t'}(t-\Delta\tau') \int B'(\sigma, \Delta\tau') \cos 2\pi\sigma x \, d\sigma$$

In order to see the output from the low-pass filter 9 when the above signal is passed through the filter, we now Fourier-transform $$III_{t'}(t - \Delta\tau')$$

with respect to t. Thus, $$\int III_{t'}(t - \Delta\tau') \exp(-i2\pi ft) dt = \exp(-i2\pi f \Delta\tau')(1/t') III_{1/t'}(f) = \quad (3)$$

$$1/t' [\delta(f) + \delta(f - 1/t') \exp\{-i2\pi(\Delta\tau'/t')\} + \ldots +$$

$$\delta(f + 1/t') \exp\{+i2\pi(\Delta\tau'/t')\} + \ldots]$$

This is a comb function, too, and appears at intervals that are reciprocals of the sampling intervals. Therefore, if the signal is passed through the low-pass filter 12, then we have $F'''(x) = 1/t' \int B'(\sigma, \Delta\tau') \cos 2\pi\sigma x \, d\sigma$ (4) The output signal from the filter 12 is represented by this formula. Comparison of equation (4) with equation (1) shows that F''(x) represents the interferogram of the sample at the instant delayed by $\Delta\tau'$ with respect to the application of a stimulus. The output signal from the low-pass filter 12 is converted into digital form by the A/D converter 8 at sampling intervals determined by the wave number range of the signal. Then, the CPU 9 takes the Fourier transform of the interferogram. Consequently, a spectrum of the sample can be obtained after delay $\Delta\tau'$ with respect to the application of the stimulus.

In the above example, the stimulus generator is controlled, using the clock pulses generated by the timer. The pulsed light source is lit up according to the clock pulses delayed by $\Delta\tau'$ by means of the variable delay circuit. That is, the stimulation is carried out first, followed by the lighting of the pulsed light source. Conversely, the pulsed light source may be lit up at intervals of t', and then the stimulation may be performed after a delay of $t'-\Delta\tau'$ from the lighting. Where the pulsed light source that is lit up periodically is used in Raman spectroscopy, for example, a light source emitting pulses of light by self-oscillation such as a mode-locked pulsed laser can be utilized.

As described above, in accordance with the present invention, time-resolved measurement is permitted by adding to the conventional system shown in FIG. 1 only a pulsed light source, a low-pass filter, and a circuit giving stimuli.

Figure 7:
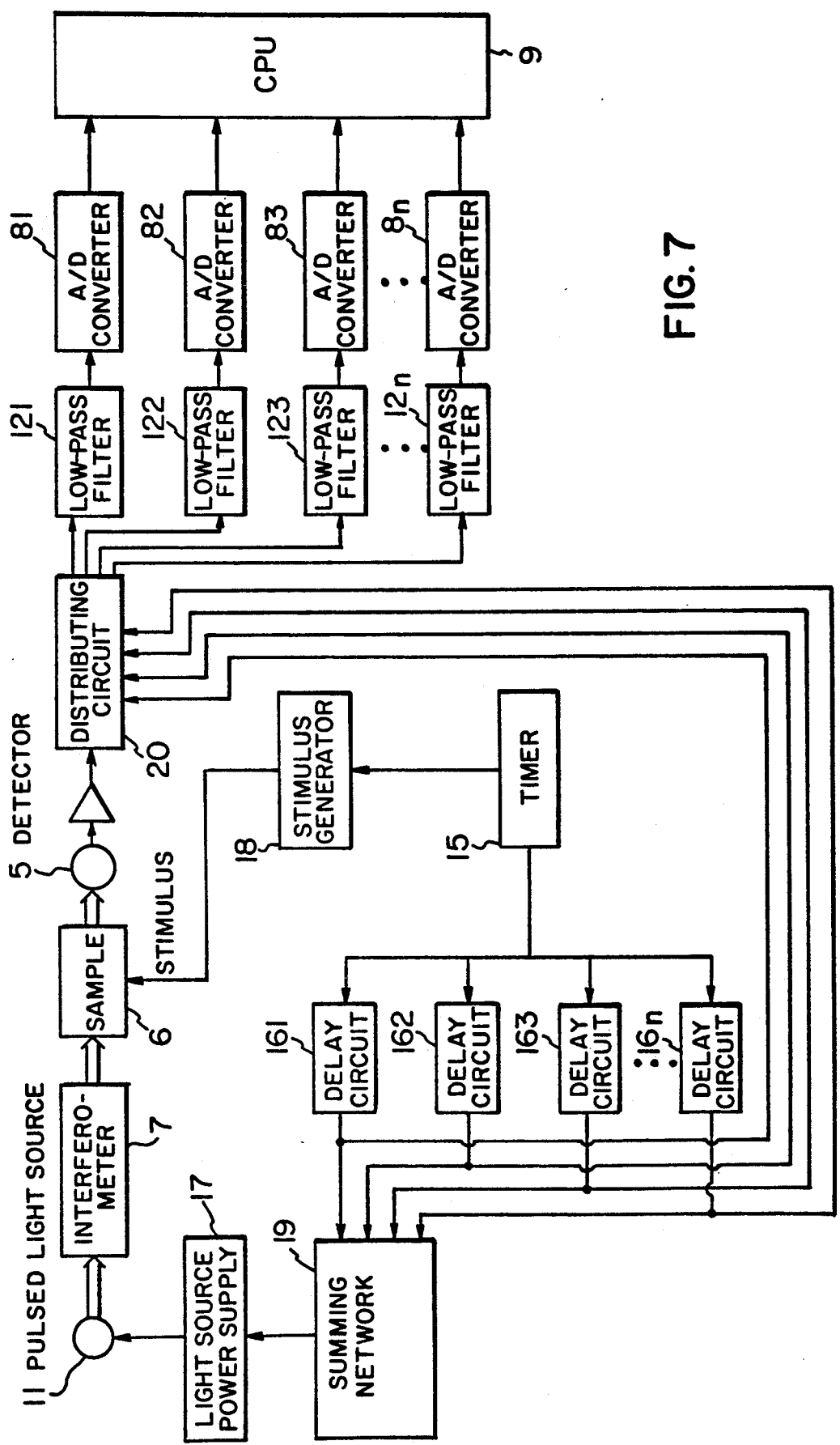
FIG. 7 is a diagram of another time-resolved spectrometer according to the invention.

FIG. 7 shows another time-resolved spectrometer according to the invention. This spectrometer is similar to the spectrometer shown in FIG. 5 except that n delay circuits $16_1-16_n$, n low pass-filters $12_1-12_n$, n A/D converters $8_1-8_n$, a summing network 19 for supplying the sum of the outputs from the delay circuits to the power supply 17, and a distributing circuit 20 are added. The distributing circuit 20 acts to distribute the output signal from the detector 5 among the low-pass filters in a time-shared manner according to the outputs from the delay circuits.

Figure 8:
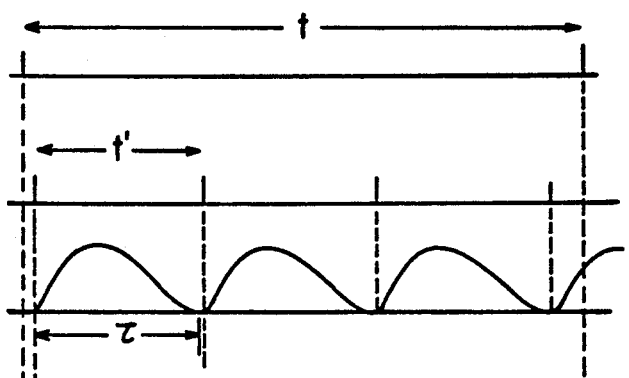
FIGS. 8(a) to 8(h) are waveform diagrams illustrating the operation of the spectrometer shown in FIG. 7.

In the above structure, different delay times $\Delta\tau_1'$, $\Delta\tau_2'$, $\Delta\tau_3'$, etc. are set into the delay circuits, respectively. Therefore, it is possible to obtain an interferogram with n different delay times in one measurement. FIG. 8 is a waveform diagram illustrating the operation of the apparatus shown in FIG. 7.

Figure 9:
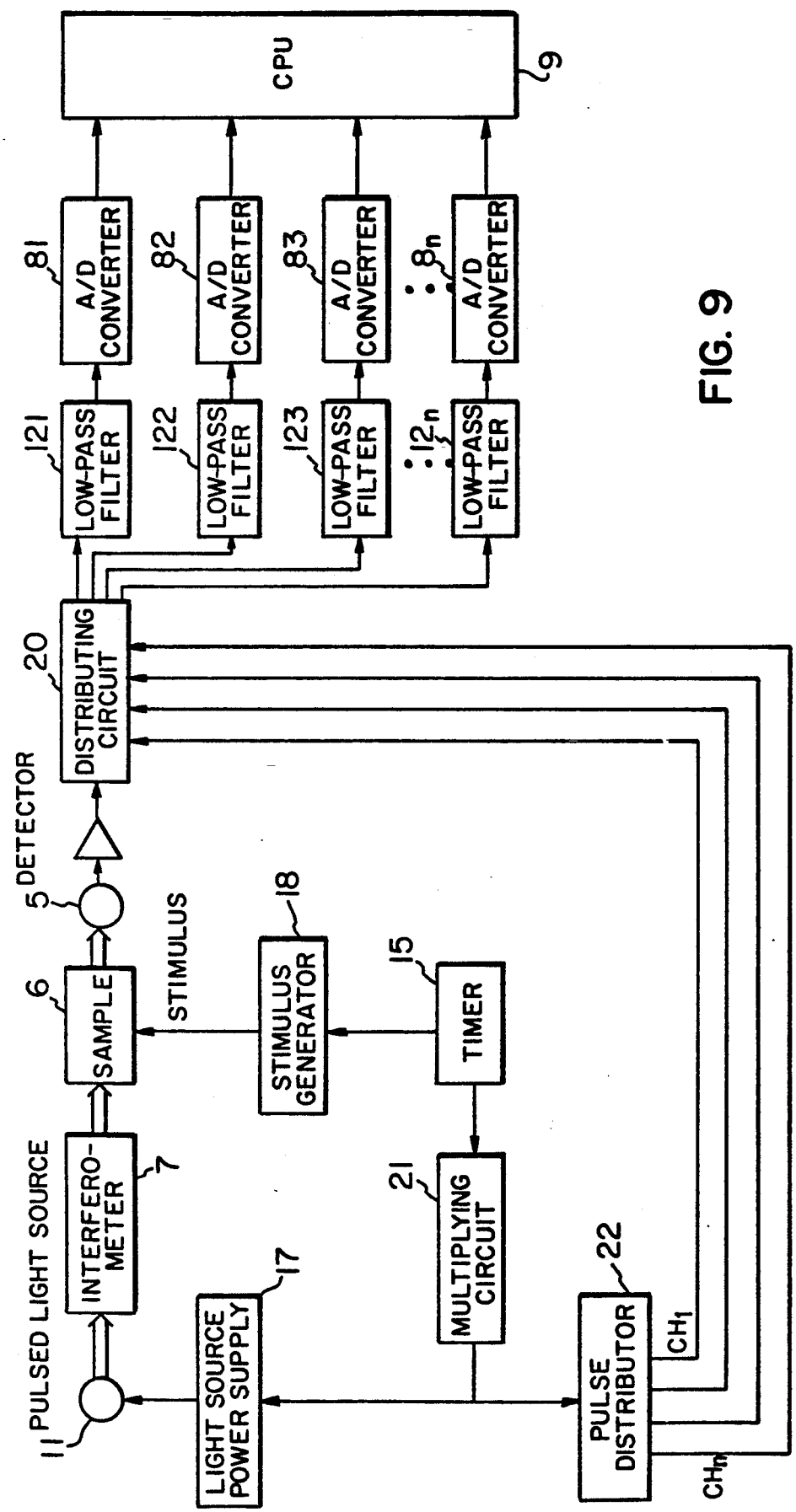
FIG. 9 is a diagram of a further time-resolved spectrometer according to the invention.

FIG. 9 shows a further time-resolved spectrometer according to the invention. This spectrometer is similar to the spectrometer shown in FIG. 7 except that the plural delay circuits used in the apparatus shown in FIG. 7 are replaced by a multiplying circuit 21 producing pulses having a repetition frequency of t'/n (n is an integer equal to or greater than 2) in response to the pulses having a repetition frequency of t' generated by the timer 15. The pulsed light source 11 is lit up according to the former pulses having the higher frequency. A pulse distributor 22 distributes the pulses of the higher frequency among n channels. Thus, n-channel switching pulses which have a period of t' and are delayed respectively by t'/n, 2t'/n, 3t'/n, etc. with respect to each stimulus are produced. The distributing circuit 20 is activated in response to these n-channel switching pulses which are out of phase with each stimulus in this way. In this example, the delay times are limited to integral multiples of t'/n, though the delay times of the delay circuits in the example shown in FIG. 7 can be set at will.

Figure 10:
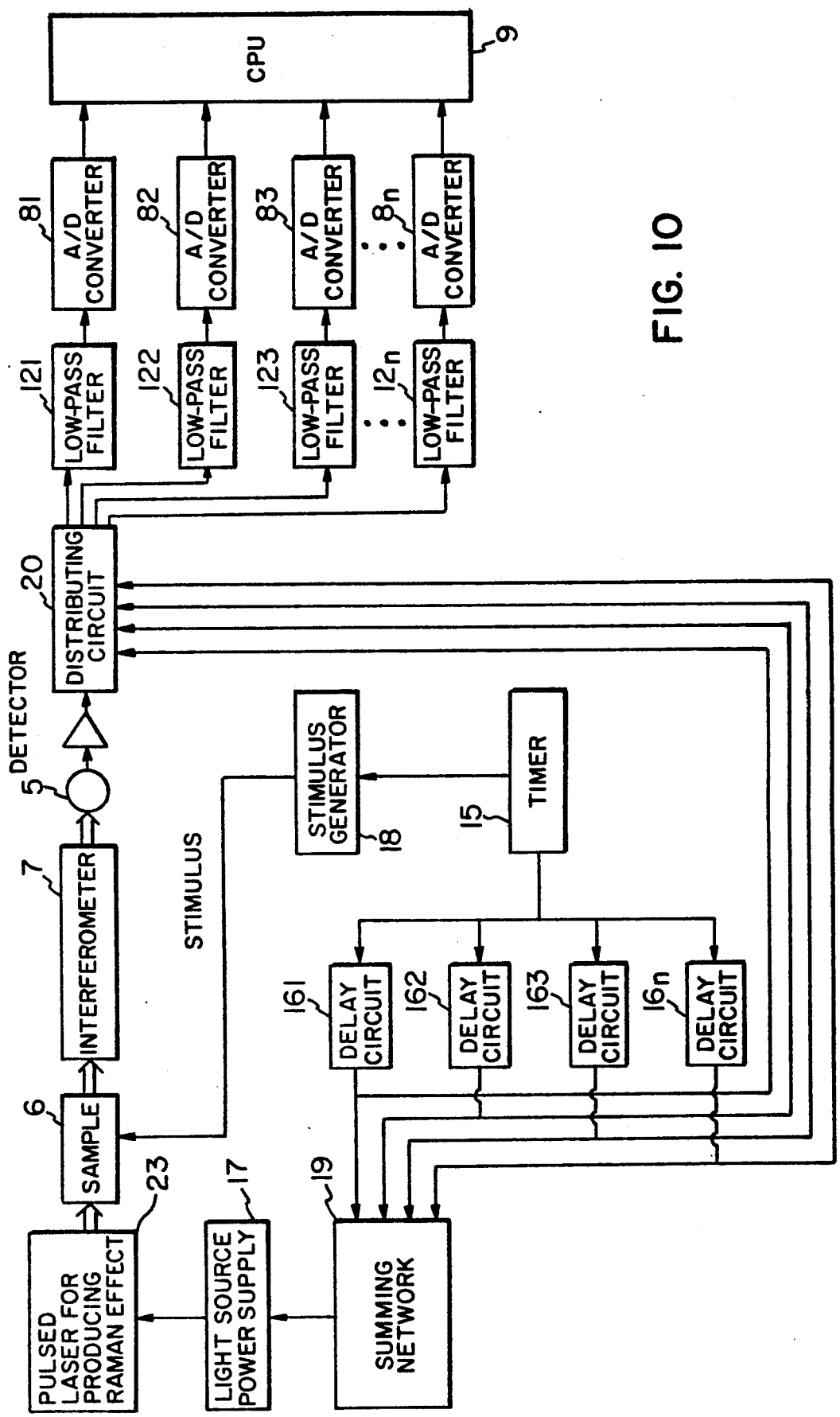
FIG. 10 is a diagram of still another time-resolved spectrometer according to the invention.

Referring next to FIG. 10, there is shown a yet other time-resolved spectrometer according to the invention. This spectrometer is similar to the spectrometer shown in FIG. 7 except that the sample 6 is placed in front of the interferometer 7 and that a pulsed laser beam emitted by a pulsed laser excitation unit 23 producing the Raman effect is directed to the sample. The resulting Raman scattering is introduced into the interferometer 7. In this example, Raman spectra produced at different instants of time during the reaction of the sample can be obtained.

Figure 11:
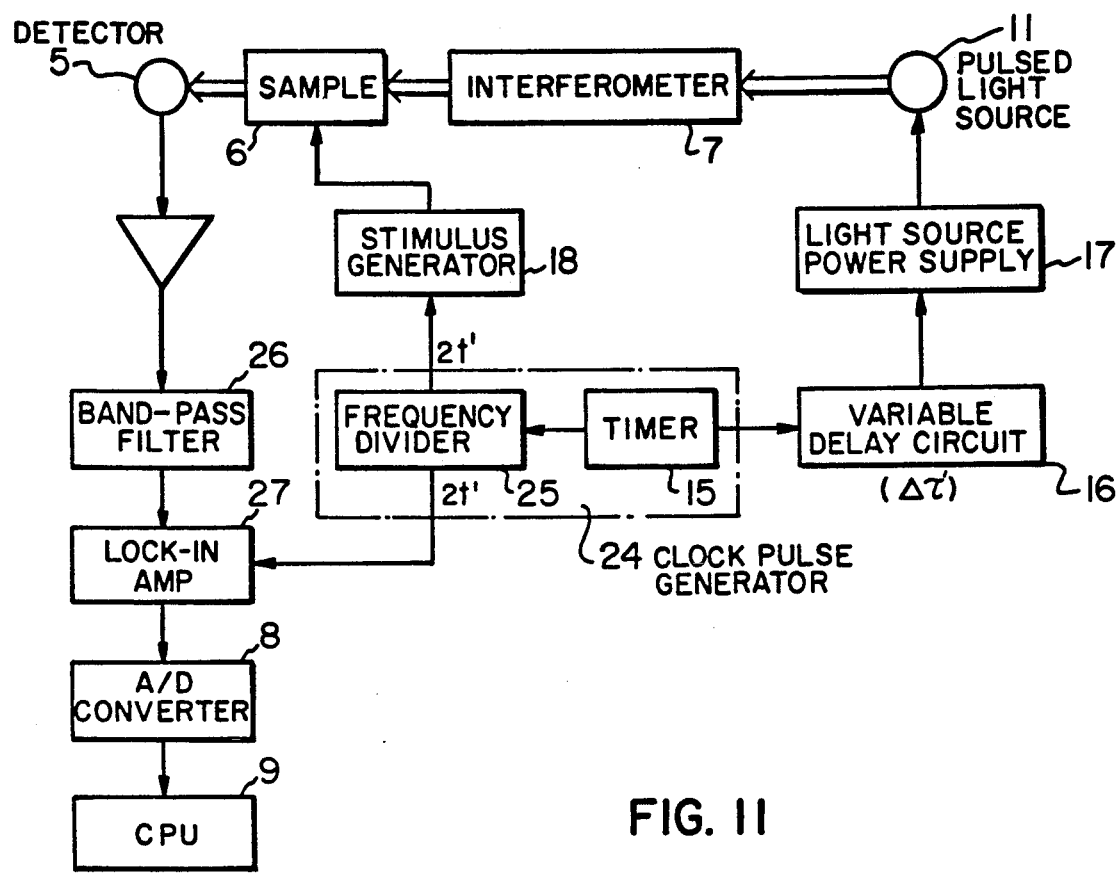
FIG. 11 is a diagram of yet another time-resolved spectrometer according to the invention.

Referring to FIG. 11, there is shown a yet further time-resolved spectrometer according to the invention. This apparatus is characterized in that the concept of the differential method is introduced in it. This apparatus includes a clock pulse generator 24 consisting of a timer 15 and a ½ frequency divider 25. The timer 15 produces first clock pulses having a period of 2t' (FIG. 12(c)) to a stimulus generator 18. The frequency divider 25 produces second clock pulses having a period of t' (FIG. 12(b)) to a power supply 17 via a variable delay circuit 16. The output from a detector 5 is supplied to an A/D converter 8 via a band-pass filter 26 and via a lock-in amplifier 27.

The stimulus generator 18 repeatedly gives a stimulus to a sample 6 at intervals of 2t' in response to the first clock pulses asynchronously with the clock pulses which are produced by the interferometer 7 and have a period of t as shown in FIG. 12(a). The variable delay circuit 16 delays the second clock pulses delivered at intervals of t' from the timer 15 by a certain time of $\Delta\tau'$. The power supply 17 lights up the pulsed light source 11 in response to the delayed clock pulses. Signal P arising from the sample in excited state is given by $$III_{2t'}(t-\Delta\tau') \int B'(\sigma, \Delta\tau')\cos 2\pi\sigma x\, d\sigma$$

Signal Q originating from the sample in steady state is given by $$III_{2t'}(t-\Delta\tau'-t') \int B(\sigma)\cos 2\pi\sigma x\, d\sigma$$

These signals P and Q alternately appear at the output of the detector 5 as shown in FIG. 12(f). The band-pass filter 26 is used to remove the higher harmonics and the lower components of the output from the detector 5.

We now discuss the output signal (FIG. 12(g)) from the band-pass filter 26 to which the output signal from the detector 5 is applied. By Fourier-transforming $III_{t'}(t-\Delta\tau')$ with respect to t, we have $$\int III_{2t'}(t-\Delta\tau')\exp(-i2\pi ft)dt = \exp(-i2\pi f\Delta\tau')(1/2t')III_{1/2t'}(f) \quad (5)$$

$$= 1/2t'\ \{\delta(f) + \delta(f-1/2t')\exp[-i2\pi(\Delta\tau'/2t')] +$$

$$\delta(f-1/t')\exp[-i2\pi(\Delta\tau'/t')] + \ldots +$$

$$\delta(f+1/2t')\exp[i2\pi(\Delta\tau'/2t')] + \ldots\}$$

We pay attention to the second term and take the Fourier transform of $III_{2t'}(t-\Delta\tau'-t')$. The second term is given by $$\tfrac{1}{2}t'\ \delta(f-\tfrac{1}{2}t')\exp[-i2\pi(\tfrac{1}{2}t')(\Delta\tau'+t')] = -\tfrac{1}{2}t'$$
$$\delta(f-\tfrac{1}{2}t')\exp[-i2\pi(\Delta\tau'/2t')] \quad (6)$$

That is, both spectra obtained by Fourier transformation are side bands of the frequency of ½t' and have a phase of $2\pi(\Delta\tau'/2t')$, but they are 180° out of phase with each other. The band-pass filter 26 is designed to pass only these two terms. Therefore, the filter 26 is required to have two pass bands which have band widths of $B(\sigma)$ and $B'$ $(\sigma, \Delta\tau')$, respectively, and both of which start at the frequency of $\tfrac{1}{2}t'$. It can be seen from equations (5) and (6) that an interferogram given by $$\int \{B'(\sigma, \Delta\tau') - B(\sigma)\} \cos 2\pi\sigma x \, d\sigma$$

is modulated at the frequency $\tfrac{1}{2}t'$. Accordingly, the output signal is supplied to the lock-in amplifier 27 and synchronized with the reference signal having the frequency $\tfrac{1}{2}t'$. Thus, we have $$\frac{1}{2t'} \int [B'(\sigma, \Delta\tau') - B(\sigma)] \cos 2\pi\sigma x \, d\sigma$$

This means that the difference between the interferogram obtained from the sample in excited state and the interferogram obtained from the sample in normal state is extracted. This differential interferogram is fed via the A/D converter 8 to the CPU 9, where the interferogram is Fourier-transformed. As a result, a differential spectrum given by $B'(\sigma, \Delta\tau') - B(\sigma)$ is obtained. Since the differential spectrum is treated in this way, the signal applied to the A/D converter 8 is compressed to compensate for the lack of the dynamic range of the converter 8. Hence, the A/D converter 8 is prevented from deteriorating the signal-to-noise ratio.

Figure 18:
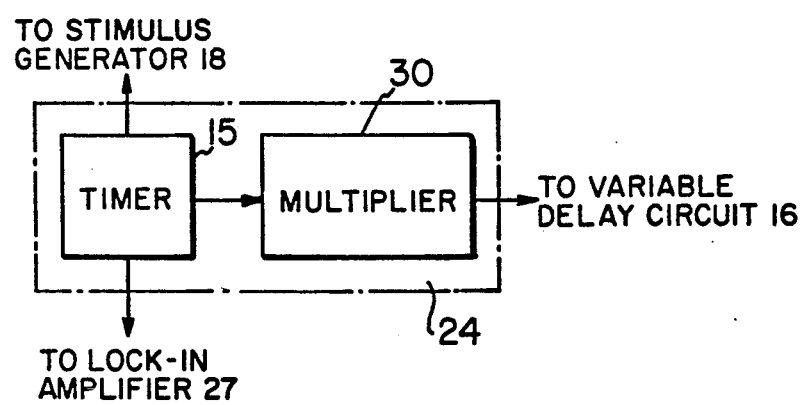
FIG. 18 is a circuit diagram of another example of the clock signal generator circuit 24 shown in FIG. 11.

In the above example, the timer 15 produces the clock pulses having the period of $t'$ to the variable delay circuit 16. The frequency divider 25 produces the clock pulses having the period of $2t'$ to the stimulus generator 18 in response to the clock pulses generated by the timer 15. A modification of this configuration is shown in FIG. 18, where a timer 15 produces clock pulses having a period of $2t'$ to the stimulus generator 18. A frequency multiplier 30 produces clock pulses having a frequency twice as high as the frequency of the clock pulses produced by the timer 15. The clock pulses from the multiplier 30 are supplied to the delay circuit 16. In this example, time-resolved spectroscopy using a pulsed light source is extended to the differential method which is affected neither by the condition of the apparatus nor by changes in the environment.

Figure 13:
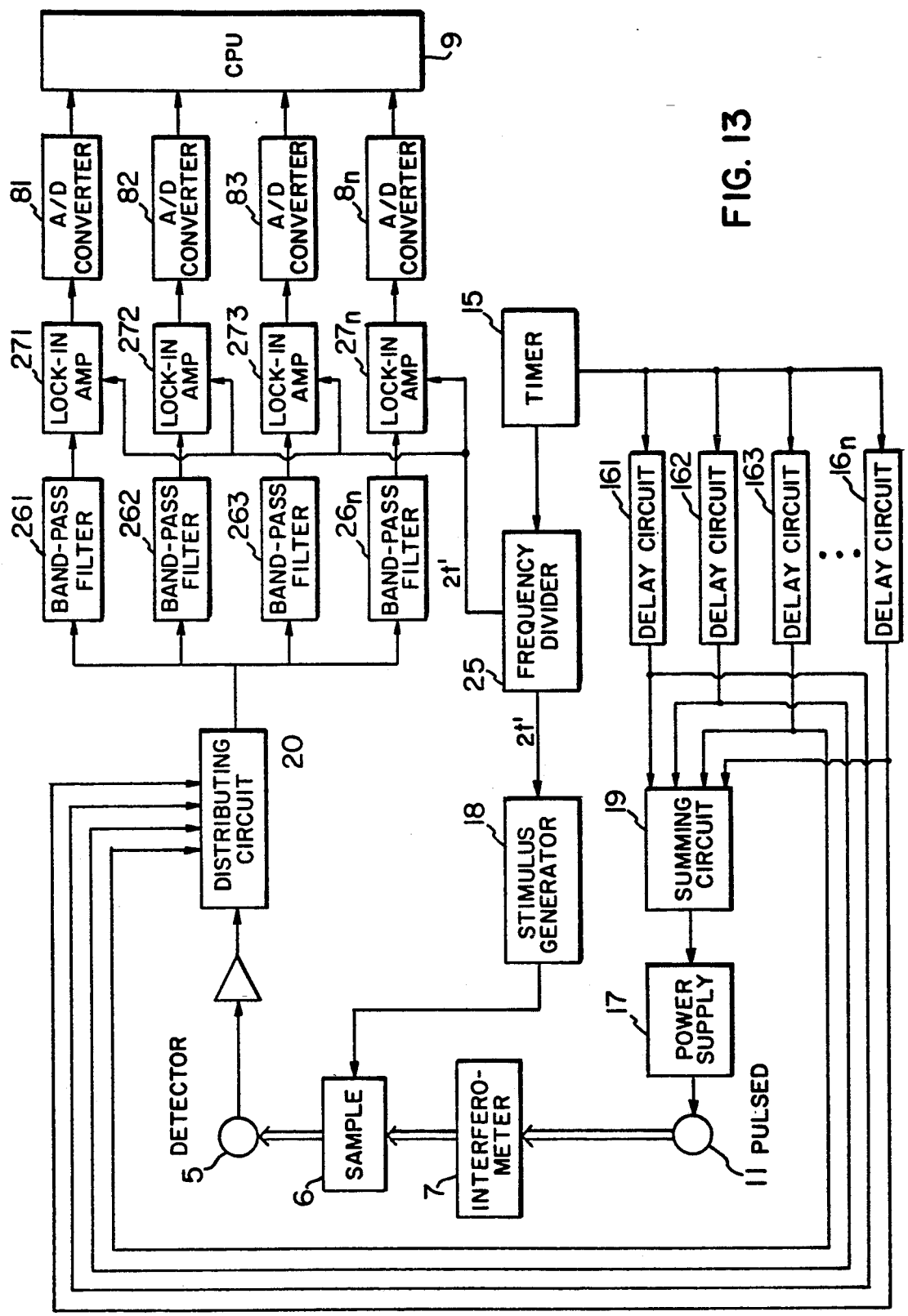
FIG. 13 is a diagram of an additional time-resolved spectrometer according to the invention.

Referring to FIG. 13, there is shown a still other time-resolved spectrometer according to the invention. This apparatus is similar to the apparatus shown in FIG. 11 except that n delay circuits $16_1$-$16_n$, n band-pass filters $26_1$-$26_n$, n lock-in amplifiers $27_1$-$27_n$, n A/D converters $8_1$-$8_n$, a summing network 19 for supplying the sum of the output signals from the delay circuits to the power supply 17, and a distributing circuit 20 are added. The distributing circuit 20 distributes the output signal from the detector 5 among the band-pass filters in response to the output signals from the delay circuits.

Figure 14:
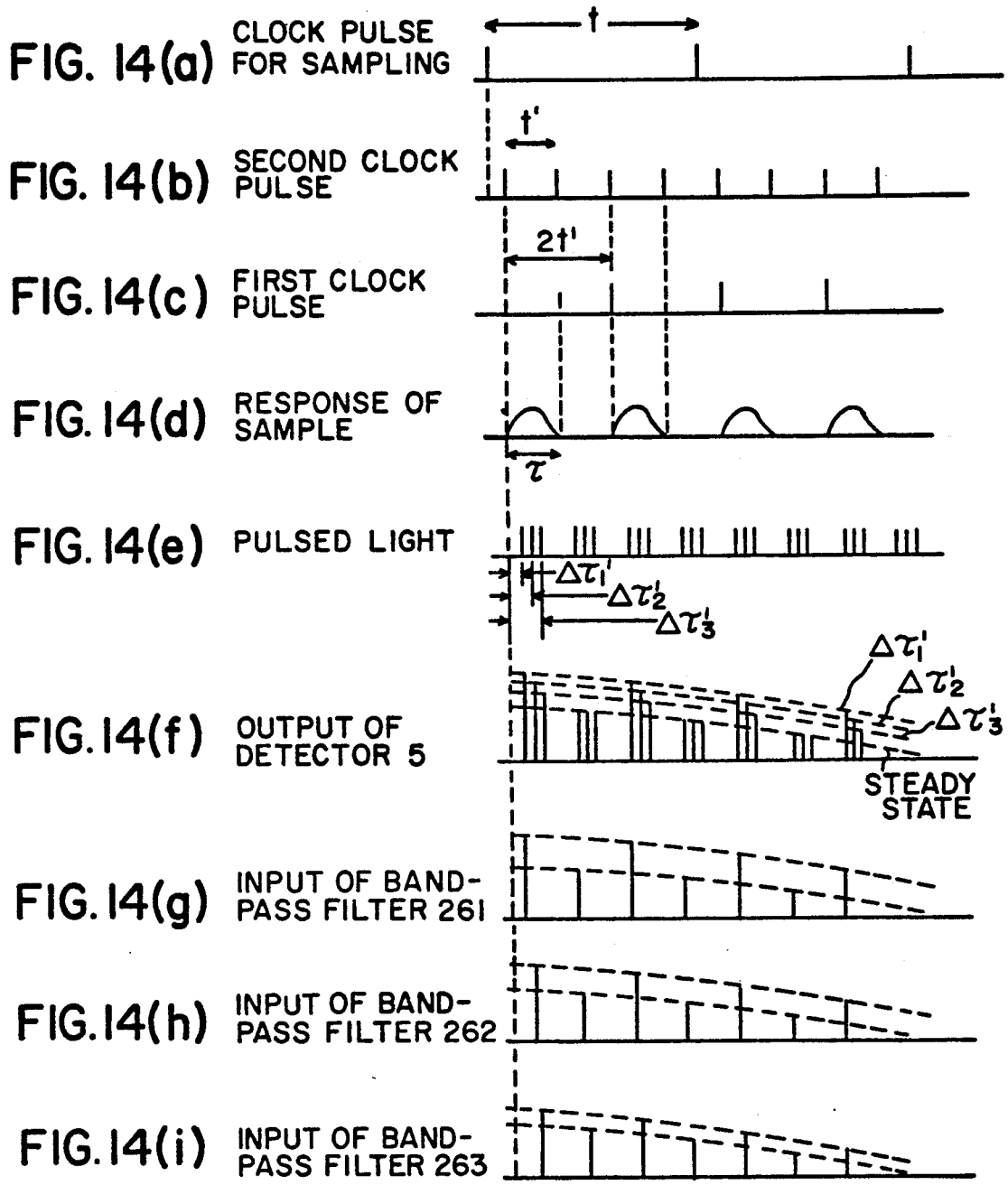
FIGS. 14(a) to 14(i) are waveform diagrams illustrating the operation of the spectrometer shown in FIG. 13.

In this structure, different delay times $\Delta\tau_1'$, $\Delta\tau_2'$, $\Delta\tau_3'$, etc. are set into the delay circuits, respectively. Therefore, it is possible to obtain an interferogram with the difference between any desired two of n different delay times in one measurement. FIG. 14 is a waveform diagram illustrating the operation of the apparatus shown in FIG. 13.

Figure 15:
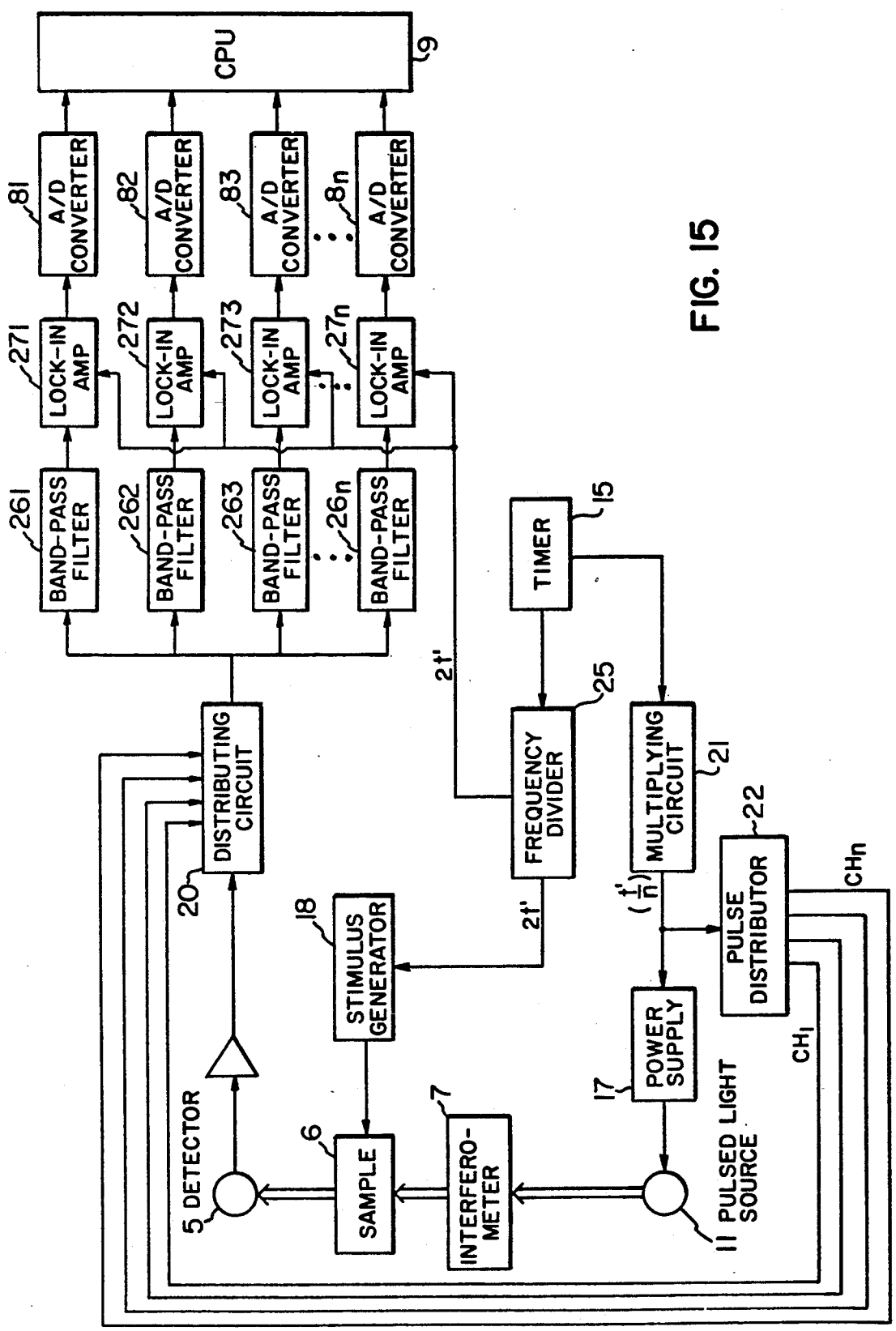
FIG. 15 is a diagram of a still further time-resolved spectrometer according to the invention.

Referring next to FIG. 15, there is shown an additional time-resolved spectrometer according to the invention. This apparatus is similar to the apparatus shown in FIG. 13 except that the plural delay circuits are replaced by a multiplier circuit 21 producing clock pulses having a period of $t'/n$ (n is an integer equal to or greater than 2) in response to the recurring pulses having the period of $t'$ delivered from the timer 15. The pulsed light source 11 is lit up at intervals of $t'/n$ in response to the pulses of the increased frequency. The pulse distributor 22 distributes the pulses of the increased frequency among the n channels to produce n-channel switching pulses which have a period of $t'$ and respectively delayed by $t'/n$, $2t'/n$, $3t'/n$, etc. with respect to each stimulus. The distributing circuit 20 is operated according to the n-channel switching pulses. In this example, the delay times are restricted to integral multiples of $t'/n$, though the delay times of the delay circuits can be set at will in the example shown in FIG. 13.

Figure 16:
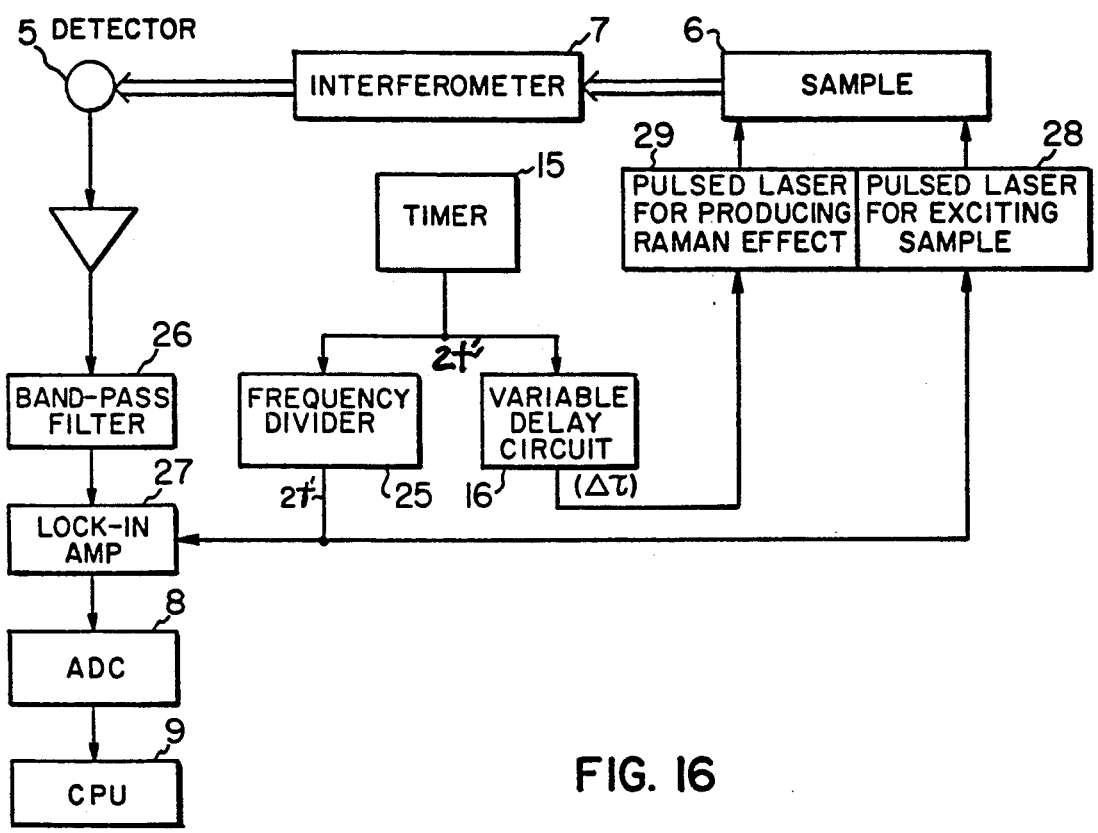
FIG. 16 is a diagram of a Fourier transform Raman spectrometer according to the invention.

FIG. 16 shows a Fourier transform Raman spectrometer according to the invention. This spectrometer exploits the differential method in the same way as the example shown in FIG. 11. In this example, the light source is removed, and the sample 6 is placed there instead of the light source. A pulsed laser 28 for exciting the sample and another pulsed laser 29 for producing the Raman effect are also employed. The laser 28 produces a pulsed laser beam in response to the clock pulses having the period of $2t'$ delivered from a frequency divider 25, in order to illuminate the sample, for exciting it. The other laser 29 emits a pulsed laser beam in response to the clock pulses having the period of $t'$, the pulses being delayed by $\Delta\tau'$ by means of the delay circuit 16 after being produced by the timer 15. This laser beam is also made to impinge on the sample 6 to induce the Raman effect.

Figure 17:
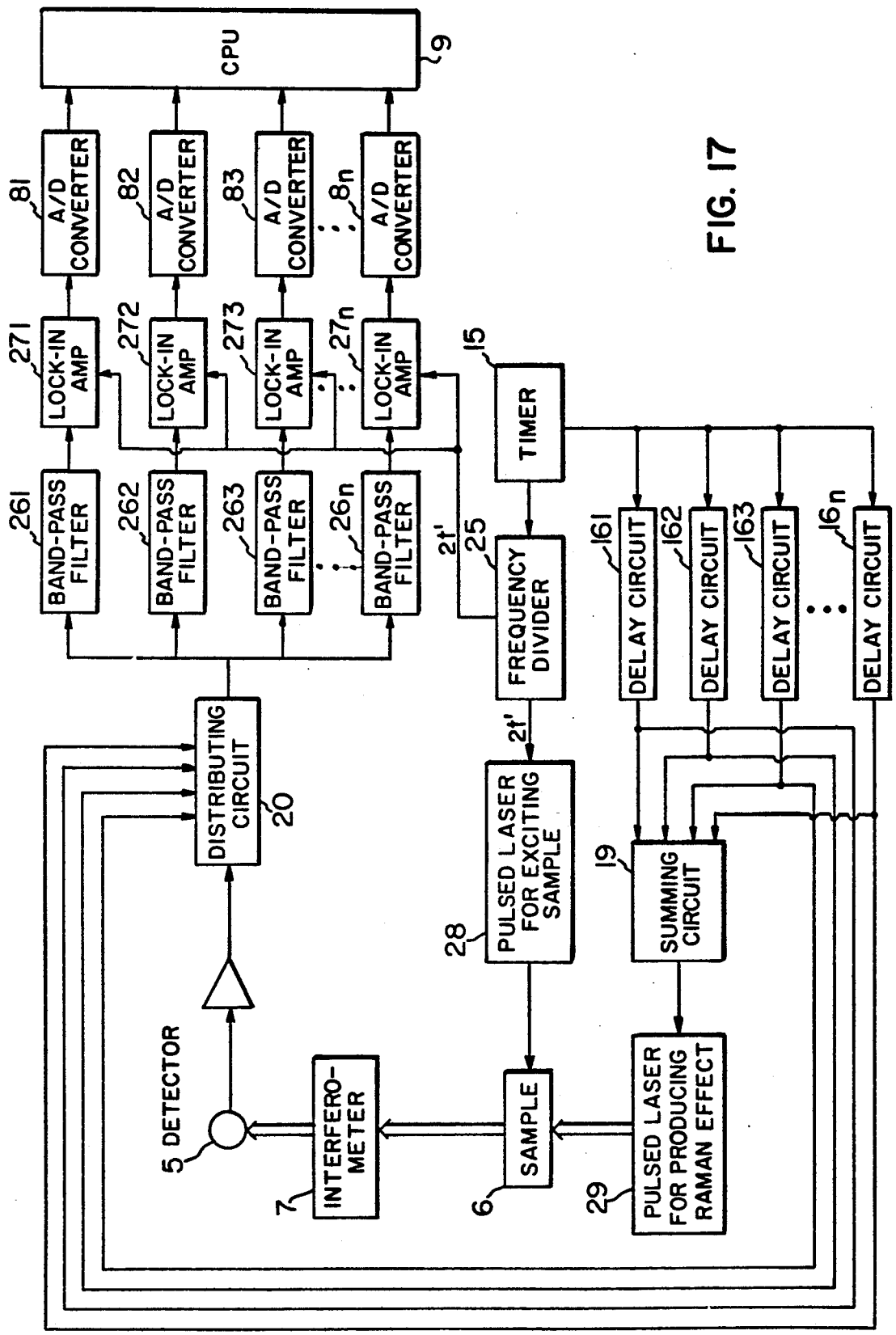
FIG. 17 is a diagram of another Fourier transform Raman spectrometer according to the invention.

FIG. 17 shows a modification of the example shown in FIG. 16. This example of FIG. 17 is similar to the example shown in FIG. 16 except that n delay circuits $16_1$-$16_n$, n band-pass filters $26_1$-$26_n$, n lock-in amplifiers $27_1$-$27_n$, n A/D converters $8_1$-$8_n$, a summing network 19 for supplying the sum of the output signals from the delay circuits to the power supply 17, and a distributing circuit 20 are added. The distributing circuit 20 distributes the output signal from the detector 5 among the band-pass filters in response to the output signals from the delay circuits.

In this structure, different delay times $\Delta\tau_1'$, $\Delta\tau_2'$, $\Delta\tau_3'$, etc. are set into the delay circuits, respectively. Therefore, it is possible to obtain an interferogram with the difference between any desired two of n different delay times in one measurement.

Having thus described the invention with the detail and particularity required by the Patent Laws, what is claimed and desired to be protected by Letters Patent is set forth in the following claims.

1. In a Fourier transform spectrometer for Fourier-transforming an inteferogram obtained from a sample and interferometer through which a single light beam is transmitted to give rise to a spectrum, said spectrometer comprising:

a light source for producing a single light beam directed to the interferomter and sample;

an activating means for impulsively and repeatedly lighting up the light source at predetermined intervals of time;

means for detecting the output intensity of the light beam transmitted through the interferometer and sample; and an interferogram-taking means for extracting the envelope of the entire output intensity from the interferometer and sample as an interferogram, whereby the interferogram can be Fourier transformed.

2. The Fourier transform spectrometer of claim 1, wherein said interferogram-taking means comprises a low-pass filter.

3. A Fourier transform spectrometer comprising:
a light source consisting of a pulsed light source emitting a single beam of pulses of light directed to the interferometer and sample;
an interference means into which light emitted by the light source is introduced and in which light beams are made to interfere with each other;
a detector into which the light emerging from the interference means and sample is introduced;
a sampling means from sampling the interferogram obtained from the detector, the pulsed light source emitting said pulses of light at intervals shorter than the sampling interval;
a Fourier transform means for Fourier-transforming the sampled interferogram to obtain a spectrum; and
a filtering means for removing higher-frequency components from the output from the detector to extract the lower-frequency components as an interferogram.

4. A time-resolved Fourier transform spectrometer comprising:
an interferometer;
a light source for emitting a single light beam directed to the interferometer and sample;
a stimulating means for periodically giving a stimulus to the sample placed in the optical path inside the interferometer;
an activating means for impulsively lighting up the light source after a predetermined delay from the application of each stimulus;
an envelope-taking means for extracting the envelope of the output from the interferometer; and
a Fourier transform means for Fourier-transforming the extracted envelope to obtain a spectrum.

5. The time-resolved Fourier transform spectrometer of claim 4, wherein said activating means impulsively lights up the light source after predetermined different delay times from the application of each stimulus, and wherein said envelope-taking means distributes the output from the interferometer among plural channels corresponding to the delay times to obtain a plurality of envelopes.

6. A time-resolved Fourier transform spectrometer comprising:
an interferometer;
a light source for emitting a single light beam directed to the interferometer and sample;
a stimulating means for periodically giving a stimulus to a sample placed in the optical path inside the interferometer;
an activating means for impulsively lighting up the light source, the lighting interval being half of the stimulating interval;
at least one band-pass filter receiving the output from the interferometer;
at least one lock-in amplifier synchronized with the lighting of the light source and receiving the output from the band-pass filter; and
a Fourier transform means for Fourier-transforming the output from the lock-in amplifier to obtain a spectrum.

7. The time-resolved Fourier transform spectrometer of claim 6, wherein
(A) said activating means impulsively lights up the light source after predetermined delay times from the application of each stimulus;
(B) said at least one band-pass filter and said at least one lock-in amplifier are a set of band-pass filters and a set of lock-in amplifiers, respectively, both sets corresponding to the delay times; and
(C) the output from the interferometer is distributed among the band-pass filters in a time-shared manner, corresponding to the delay times.

8. In a Fourier transform spectrometer for Fourier-transforming an interferogram obtained from a sample and interferometer through which a light beam is transmitted to give rise to a spectrum, said spectrometer comprising:
a sample which is made to emit pulses of light at predetermined intervals;
an activating means for impulsively and repeatedly making said sample emit light at said predetermined intervals of time;
means for detecting the output intensity from said interferometer and said sample; and
an interferogram-taking means for extracting the envelope of the entire output intensity from said interferometer and said sample as an interferogram, whereby said interferogram can be Fourier transformed.

9. The Fourier transform spectrometer of claim 8, wherein said interferogram-taking means comprises a low-pass filter.

10. A time-resolved Fourier transform spectrometer comprising:
an interferometer;
a sample which is made to emit pulses of light directed to said interferometer at given intervals of time;
a stimulating means for periodically giving a stimulus to said sample;
an activating means for impulsively making said sample emit light after a predetermined delay from the application of each stimulus;
an envelope-taking means for extracting the envelope of the output from said interferometer; and
a Fourier transform means for Fourier-transforming the extracted envelope to obtain a spectrum.

11. The time-resolved Fourier transform spectrometer of claim 10, wherein said activating means impulsively makes said sample emit light after predetermined, different delay times from the application of each stimulus, and wherein said envelope-taking means distributes the output from said interferometer among plural channels corresponding to the delay times to obtain a plurality of envelopes.

12. A time-resolved Fourier transform spectrometer comprising:
an interferometer;
a sample which is made to emit light directed to said interferometer at predetermined intervals of time;
a stimulating means for periodically giving a stimulus to said sample;
activating means for impulsively making said sample emit light at said predetermined interval where the predetermined interval is half of the stimulating interval;
at least one band-pass filter receiving the output from said interferometer;

at least one lock-in amplifier synchronized with the lighting of said sample and receiving the output from said at least one band-pass filter; and a Fourier transform means for Fourier-transforming the output from said lock-in amplifier to obtain a spectrum.

13. The time-resolved Fourier transform spectrometer of claim 12, wherein (A) said activating means impulsively makes said sample emit light after predetermined delay times from the application of each stimulus;

(B) said at least one band-pass filter and said at least one lock-in amplifier are a set of band-pass filters and a set of lock-in amplifiers, respectively, both sets corresponding to the delay times; and (C) the output from said interferometer is distributed among said band-pass filters in a time-shared manner, corresponding to said delay times.

* * * * *

UNITED STATES PATENT AND TRADEMARK OFFICE
CERTIFICATE OF CORRECTION

PATENT NO. : 5,196,903
DATED : March 23, 1993
INVENTOR(S): Koji Masutani

It is certified that error appears in the above-identified patent and that said Letters Patent is hereby corrected as shown below:

Cover page, after [73] Assignee: "Jeol" should read --JEOL--.

Column 3 Line 39 after "source" insert --11.--.

Claim 1 Line 59 Column 8 "interferomter" should read --interferometer--.

Signed and Sealed this

Thirtieth Day of November, 1993

Attest:

BRUCE LEHMAN

Attesting Officer

Commissioner of Patents and Trademarks